(12) United States Patent
Takada et al.

(10) Patent No.: US 6,793,056 B2
(45) Date of Patent: Sep. 21, 2004

(54) ONE-WAY CLUTCH AND ONE-WAY CLUTCH ASSEMBLY

(75) Inventors: Seiichi Takada, Mie (JP); Masaaki Honda, Mie (JP); Chiharu Ito, Mie (JP)

(73) Assignee: NTN Corporation, Osaka (JP)

(*) Notice: Subject to any disclaimer, the term of this patent is extended or adjusted under 35 U.S.C. 154(b) by 69 days.

(21) Appl. No.: 10/207,180

(22) Filed: Jul. 30, 2002

(65) Prior Publication Data

US 2003/0024785 A1 Feb. 6, 2003

(30) Foreign Application Priority Data

Jul. 31, 2001 (JP) .......................................... 2001-232189
Sep. 18, 2001 (JP) .......................................... 2001-283484

(51) Int. Cl.[7] .......................................... F16D 41/064
(52) U.S. Cl. .......................................... 192/45; 192/38
(58) Field of Search .......................... 192/45, 38, 44; 188/82.84

(56) References Cited

U.S. PATENT DOCUMENTS

| | | | | |
|---|---|---|---|---|
| 1,985,406 A | * | 12/1934 | Galkin | 192/45 |
| 2,019,702 A | * | 11/1935 | Hernlund et al. | 242/538.2 |
| 2,350,627 A | * | 6/1944 | Malachowski | 192/38 |
| 2,505,794 A | * | 5/1950 | Schofield | 192/45 |
| 2,633,951 A | * | 4/1953 | Ayer et al. | 192/45 |
| 2,664,183 A | * | 12/1953 | Payne | 192/45 |
| 2,712,246 A | * | 7/1955 | Zakrajsek | 192/45 |
| 2,769,515 A | * | 11/1956 | Thomas et al. | 192/45 |
| 3,064,776 A | * | 11/1962 | Curran | 192/45 |
| 3,064,777 A | * | 11/1962 | Boedigheimer et al. | 192/45 |
| 3,606,187 A | * | 9/1971 | Hahn | 192/45 |
| 4,909,366 A | * | 3/1990 | Tanaka | 192/45 |
| 6,311,814 B1 | * | 11/2001 | Nakagawa et al. | 192/45 |

FOREIGN PATENT DOCUMENTS

JP 2-190628 A * 7/1990

* cited by examiner

Primary Examiner—Rodney H. Bonck
(74) Attorney, Agent, or Firm—Wenderoth, Lind & Ponack, L.L.P.

(57) ABSTRACT

A one-way clutch is provided which has improved compactness. The one-way clutch comprises an inner member, an outer ring relatively rotatably mounted on the inner member, a rolling element mounted between the inner member and the outer ring, and a spring member for biasing the rolling element in one direction. A rolling element receiving portion having a predetermined wedge angle and a spring receiving portion communicating with the rolling element receiving portion are provided between the inner member and the outer ring. The spring member is received in the spring receiving portion, and the rolling element is received in the rolling element receiving portion and biased by the spring member toward the narrow side of the rolling element receiving portion. The inner member has a semi-columnar portion, which forms the rolling element receiving portion and the spring receiving portion.

13 Claims, 15 Drawing Sheets

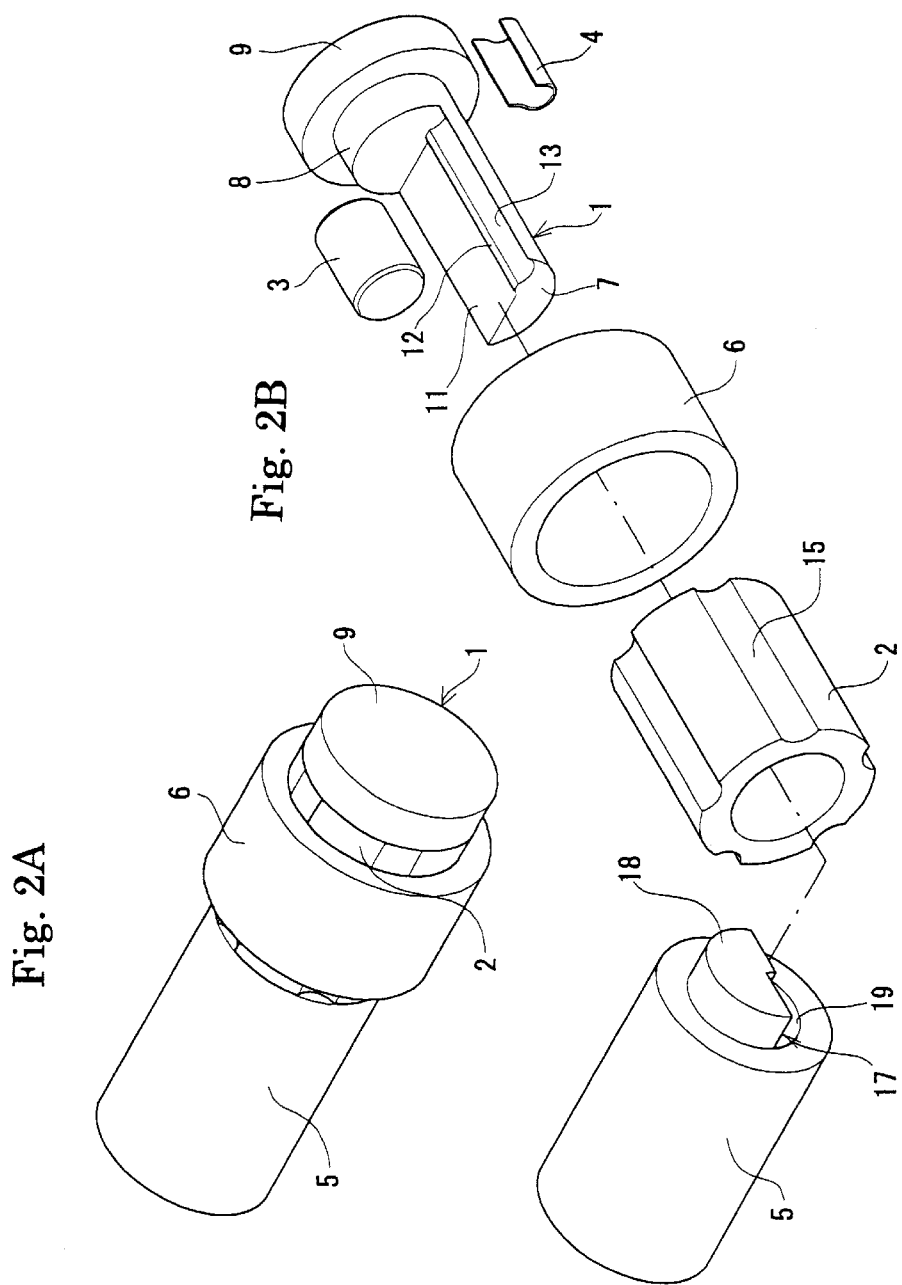

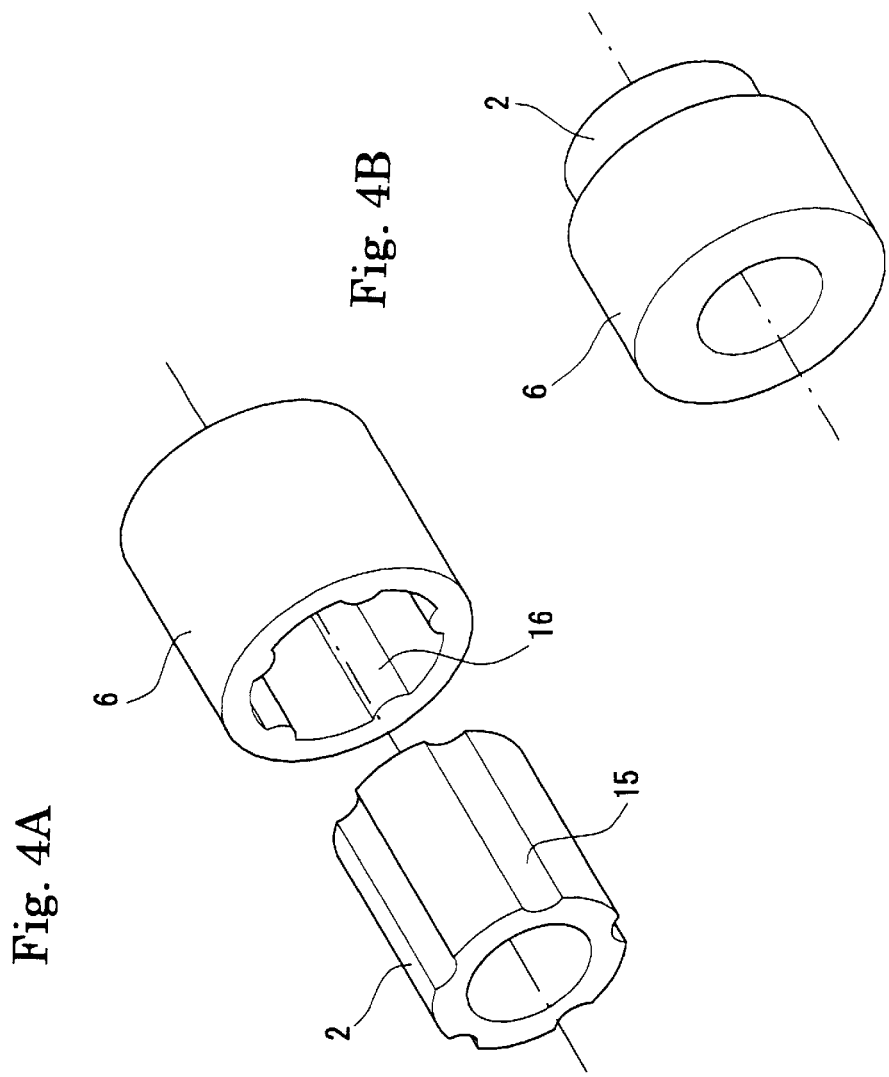

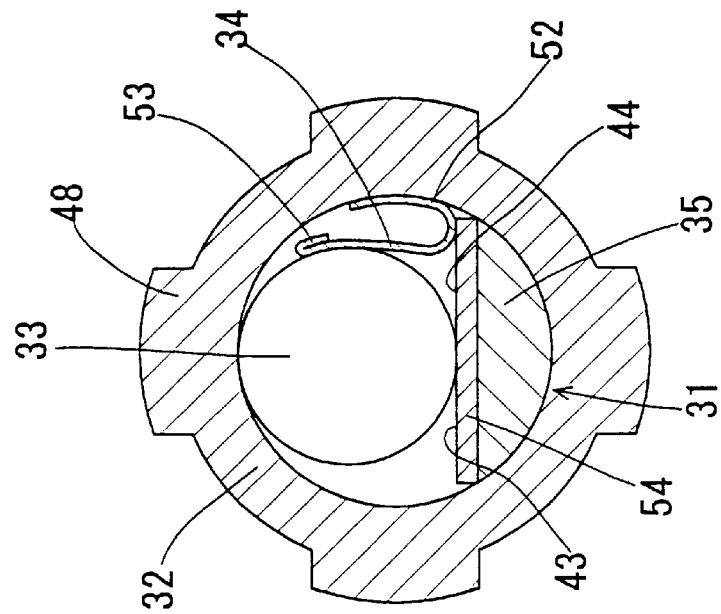
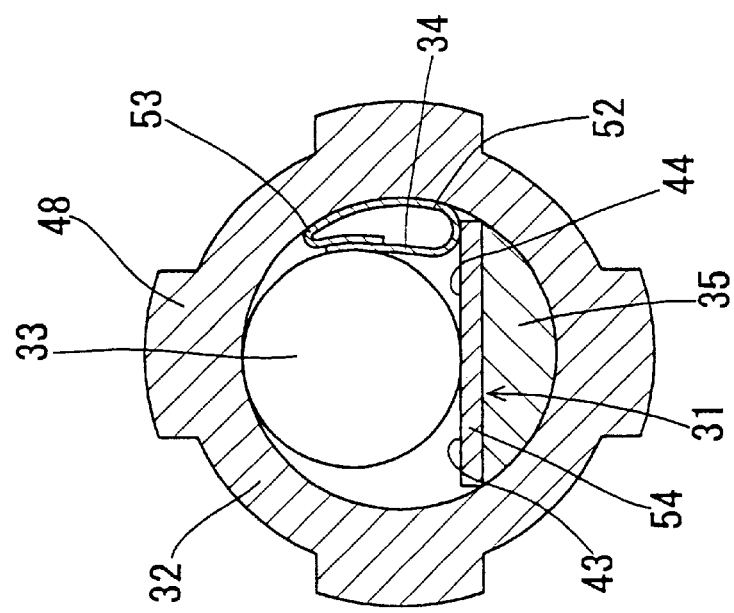

ONE-WAY CLUTCH AND ONE-WAY CLUTCH ASSEMBLY

BACKGROUND OF THE INVENTION

This invention relates to a one-way clutch and a one-way clutch assembly, and particularly ones improved in compactness.

As one-way clutches used in drive units of electric devices and office devices, one as shown in FIG. 15 is known (JP patent publication 9-89011). It has roller receiving portions 24 formed in the inner-diameter surface of an outer ring 22 fitted on a shaft 21. On the bottom of each roller receiving portion 24, a cam surface 25 is formed so as to form a predetermined wedge angle between the cam surface 25 and the shaft 21. In the wide side of each roller receiving portion 24, a spring receiving recess 26 is formed.

A roller 27 is received in each roller receiving portion 24, and a spring member 28 received in each spring receiving recess 26 is pressed against the roller 27 to bias the roller toward the narrow side of the roller receiving portion 24 to stabilize the operation of the rollers 27.

On the outer ring 22, an outer annulus 29 is mounted so as not to rotate relative to the outer ring 22. The outer annulus 29 closes one end of the roller receiving portions 24 with one end face thereof. The other end faces of the roller receiving portions 24 are closed by an unillustrated lid member.

This one-way clutch is used with the outer annulus 29 mounted in a boss portion of a rotary member such as a gear. When the outer ring 22 rotates relative to the shaft 21 in a direction (shown by arrow A in FIG. 15), the rollers 27 will bite into the narrow sides of the roller receiving portions 24 and get locked, so that torque is transmitted with the shaft 21 and the torque limiter integrated. When the rotating direction is in reverse, since the rollers 27 move toward the wide sides of the roller receiving portions 24, the rollers 27 will get free, so that the one-way clutch idles and the torque is not transmitted.

In various devices in which this type of one-way clutch is used (paper feeding roller driving portions of printers/copiers, personal computers, portable information terminals, etc.), as the device bodies become compact, compactness of the one-way clutch is required. But in the conventional structure, since its outer diameter was necessarily larger than the diameter of the shaft, compactness was limited.

An object of this invention is to provide a one-way clutch that meets the requirement for compactness.

SUMMARY OF THE INVENTION

According to this invention, there is provided a one-way clutch comprising an inner member, an outer ring relatively rotatably mounted on the inner member, a rolling element mounted between the inner member and the outer ring, and a spring member for biasing the rolling element in one direction, a rolling element receiving portion having a predetermined wedge angle and a spring receiving portion communicating with the rolling element receiving portion being provided between the inner member and the outer ring, the spring member being received in the spring receiving portion, the rolling element being received in the rolling element receiving portion and biased by the spring member toward the narrow side of the rolling element receiving portion, wherein the inner member comprises a semi-columnar portion, and the rolling element receiving portion and the spring receiving portion are formed by the semi-columnar portion.

This one-way clutch is used with one end of the inner member coupled to a shaft. When the inner member, which is integral with the shaft, rotates relative to the outer ring in one direction, locking occurs due to biting of the rolling element, so that torque is transmitted, as in the prior art. When it rotates in the reverse direction, the rolling element gets free and idles, so that transfer of torque is shut off. Since the rolling element receiving portion and the spring receiving portion are provided in the inner member at the cut-out portion, the size of the one-way clutch can be reduced markedly compared with conventional devices.

The numbers of the rolling element receiving portions and the spring receiving portions (equal to the number of the rolling elements) are determined according to the load capacity. They are sometimes provided in only one set.

The semi-columnar member is formed with a cam surface for forming a wedge angle for the rolling element receiving portion, a roller stopper rib, and a spring seat for the spring member. The cam surface is formed by a cut-out surface parallel to a diametrical line of the inner member. The spring seat is disposed opposite to the cam surface relative to the roller stopper rib.

With this arrangement, the cam surface can be formed easily. Also, by the provision of the roller stopper rib, retraction of the rolling element beyond a predetermined range is prevented. This prevents the spring member from being collapsed by the rolling element during idling and prevents the rolling element from becoming locked during idling.

According to this invention, the inner member is provided with a coupling portion with a shaft, a radial bearing portion for the outer ring, and a flange having a larger diameter than the radial bearing portion and abutting one end face of the outer ring. The radial bearing performs the function of allowing smooth rotation of the inner member and the outer ring while keeping them in a concentric state. The flange prevents the inner member from coming out.

By providing an outer annulus on the outer ring, there is provided a one-way clutch assembly comprising a combination of the one-way clutch and the outer annulus. Also, by coupling a shaft to the coupling portion provided on the inner member, a one-way clutch assembly is provided which comprises a combination of the one-way clutch and the shaft.

In another embodiment of the present invention, the semi-columnar member is formed with a flat surface, and a cam surface for the rolling element receiving portion and a spring seat for the spring receiving portion are formed on the flat surface. With this arrangement, the inner member has a simple shape and is easier to manufacture.

In still another embodiment, a reinforcing plate is mounted on the flat surface, and the cam surface and the spring seat are formed on the flat surface. With this embodiment, the cam surface can bear the surface pressure applied from the rolling element during locking more securely. Thus, the allowable torque can be set to a higher value. Also, the inner member can be made by resin molding or sintering.

Also, the spring member may be provided with a restricting portion for restricting the retraction of the rolling element during idling. This prevents locking of the rolling member during idling.

Also, the inner member may comprise an integrated shaft member and a lid member and a radial bearing can be formed on the integrated shaft member and the lid member to support both ends of the outer ring.

BRIEF DESCRIPTION OF THE DRAWINGS

Other features and objects of the present invention will become apparent from the following description made with reference to the accompanying drawings, in which:

FIG. 2A is a perspective view of the same;

FIG. 2B is an exploded perspective view of the same;

FIG. 4A is an exploded perspective view of a modification of the first embodiment;

FIG. 4B is a perspective view of another modification of the first embodiment;

FIG. 14A is a sectional view of a modification of the third embodiment;

FIG. 14B is a sectional view of another modification of the third embodiment.

DETAILED DESCRIPTION OF THE PREFERRED EMBODIMENTS

First Embodiment

Figure 1A:
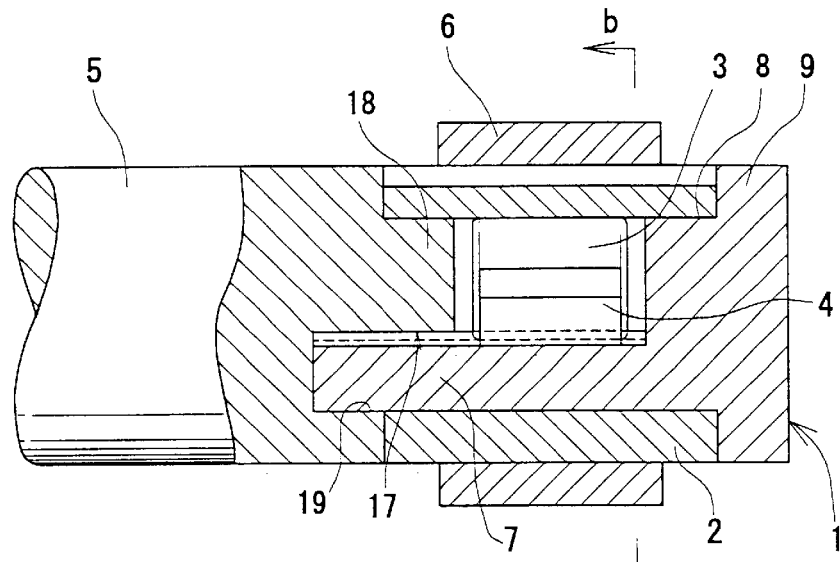
FIG. 1A is a partially omitted sectional view of a first embodiment.

A first embodiment of this invention will be described with reference to the accompanying drawings. As shown in FIGS. 1 and 2, this embodiment shows a one-way clutch assembly in which a one-way clutch comprising an inner member 1, an outer ring 2, a roller 3 and a spring member 4 are combined with a shaft 5 and an outer annulus 6.

Figure 1B:
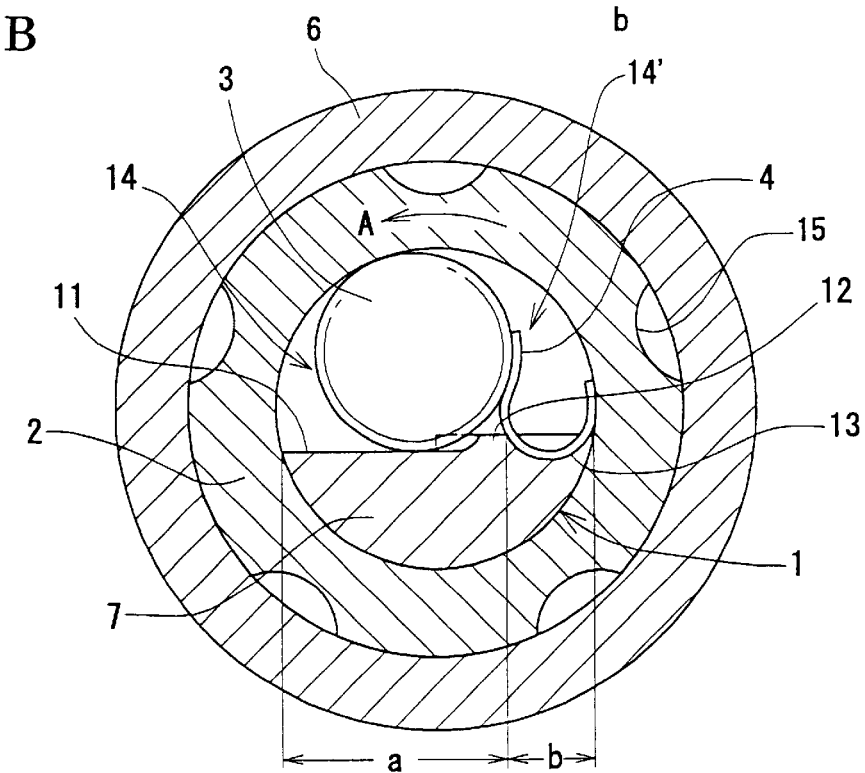
FIG. 1B is an enlarged sectional view taken along line b—b of FIG. 1A.

As shown in FIGS. 1B and 2B, the inner member 1 has a semi-columnar portion 7 formed by cutting off part of a columnar portion along a surface parallel to a diameter at a predetermined position. At one end of the semi-columnar portion 7, a radial bearing portion 8 is formed which comprises a cylindrical portion. At the outer end face of the radial bearing portion 8, a flange 9 having a larger diameter is formed. The semi-columnar portion 7 is formed with a flat cam surface 11 on one side of a longitudinal roller stopper rib 12, and a spring seat 13 comprising a recessed surface on the other side. The ratio between the width a of the cam surface 11 and the width b of the spring seat 13 is about two to one in this embodiment (FIG. 1B).

The outer ring 2 is rotatably mounted on and supported by the arcuate surface of the semi-columnar portion 7 and the radial bearing portion 8. Its outer diameter is equal to the diameter of the shaft 5. The flange 9 is pressed against one end of the outer ring 2. A roller receiving portion 14 is formed by the inner peripheral surface of the outer ring 2 and the cam surface 11.

Figure 3A:
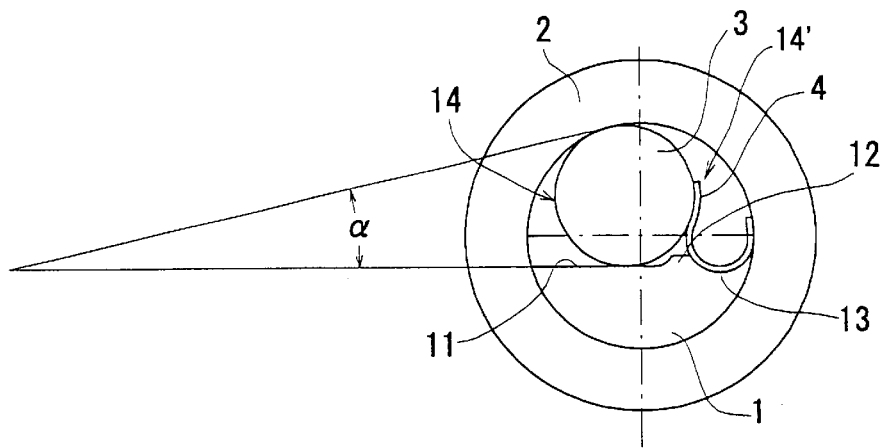
FIG. 3A is an explanatory view of the wedge angle of the same.

For the roller receiving portion 14, the side where the cam surface 11 and the inner-diameter surface of the outer ring 2 contact the roller 3 is its narrow side, while the side of the roller stopper rib 12 is its wide side. The roller 3 is received in the roller receiving portion 14. The angle a formed by the cam surface 11 and the tangent line drawn at the contact point between the inner-diameter surface of the outer ring 2 and the roller 3 (FIG. 3A) is referred to as a wedge angle. The wedge angle a is suitably set between zero and ten degrees.

A spring receiving portion 14' communicating with the roller receiving portion 14 is formed by the spring seat 13 and the inner-diameter surface of the outer ring 2. The spring member 4 received therein is formed by bending a leaf spring. By fitting the bent portion in the spring seat 13 and pressing its free end against the roller 3, the roller is biased toward the narrow side of the roller receiving portion 14.

The outer annulus 6 is a metallic cylindrical member pressed onto the outer-diameter surface of the outer ring 2. In use, it is made integral with a boss of e.g. a gear. If the outer annulus 6 is formed of a synthetic resin, creep may occur relative to the outer ring 2 due to low dimensional accuracy. Thus, as shown in FIG. 4A, axial ribs 16 formed on the inner-diameter surface of the outer annulus 6 fit in grooves 15 formed in the outer-diameter surface of the outer ring 2 to prevent relative turning by engagement of the axial ribs 16 in the grooves 15. As shown in FIG. 4B, the outer ring 2 and the outer annulus 6 may be integral with each other.

The shaft 5 has the same outer diameter as that of the outer ring 2 (FIG. 1A). While the length varies according to use, in this embodiment, a coupling portion 17 is provided at one end of the shaft 5. As shown in FIG. 2B, the coupling portion 17 comprises a semi-columnar portion 18 having a section of a cut-out circle and having an arcuate surface adapted to be fitted in the outer ring 2, and a cut-out portion 19 having the same arc as the portion 18. The semi-columnar portion 18 has a sectional shape complementary to the cam surface 11, the roller stopper rib 12 and the spring seat 13 formed on the semi-columnar portion 7. Thus, the semi-columnar portion 18 and the semi-columnar portion 7 cooperate to form a columnar portion, which forms a radial bearing fitted in the inner-diameter surface of the outer ring 2.

Also, the cut-out portion 19 has a sectional shape complementary with the sectional shape of the semi-columnar portion 7 so that the tip of the semi-columnar portion 7 of the inner member 1 can be pressed into the cut-out portion 19.

By engaging the tip of the semi-columnar portion 7 with the semi-columnar portion 18, one end face of the outer ring 2 is closed while the axial movement of the roller 3 and the spring member 3 inside the outer ring 2 is restricted.

The one-way clutch assembly of this embodiment is structured as above. If the outer ring 2 rotates relative to the inner member 1 toward the narrow side of the roller receiving portion 14 as a result of relative rotation of the shaft 5 and the outer annulus 6 (see arrow A of FIG. 1B), the roller 3 will move in the same direction, thus biting and getting locked. Thus, torque is transmitted from the shaft 5 to the outer annulus 6 or in the direction opposite thereto.

Figure 3B:
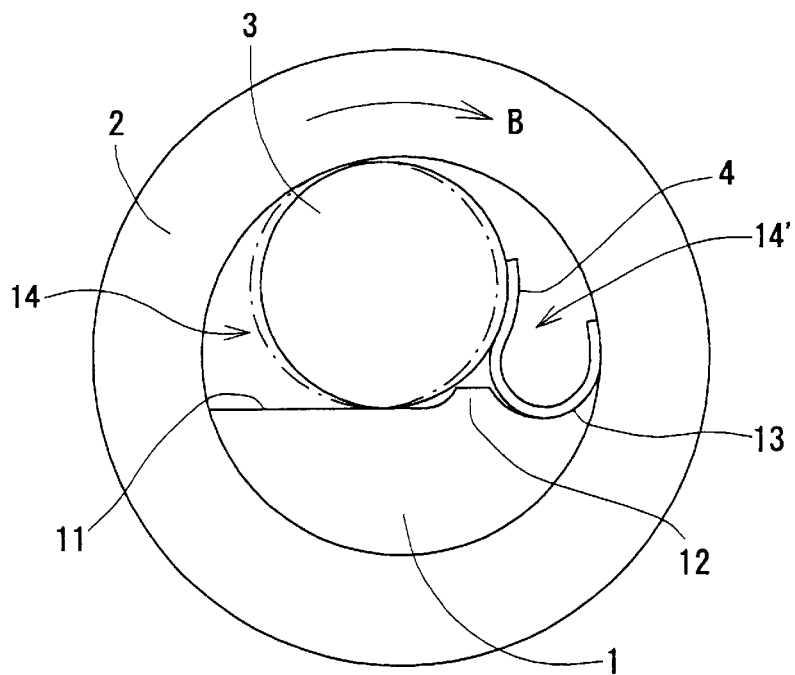
FIG. 3B is a view for explaining the operation of the same.

If the rotational direction is opposite to the above direction (see arrow B of FIG. 3B), the roller 3 will move to the wide side (from one-dot chain line to solid line in FIG. 3B), so that the roller 3 will become free and thus the transmission of torque is shut off. In this case, since retraction of the roller 3 beyond a limit is prevented by the roller stopper rib 12, the spring member 4 is prevented from being collapsed.

Although the roller 3 is used as the rolling element in this embodiment, a ball may be used instead of the roller.

Second Embodiment

Figure 5:
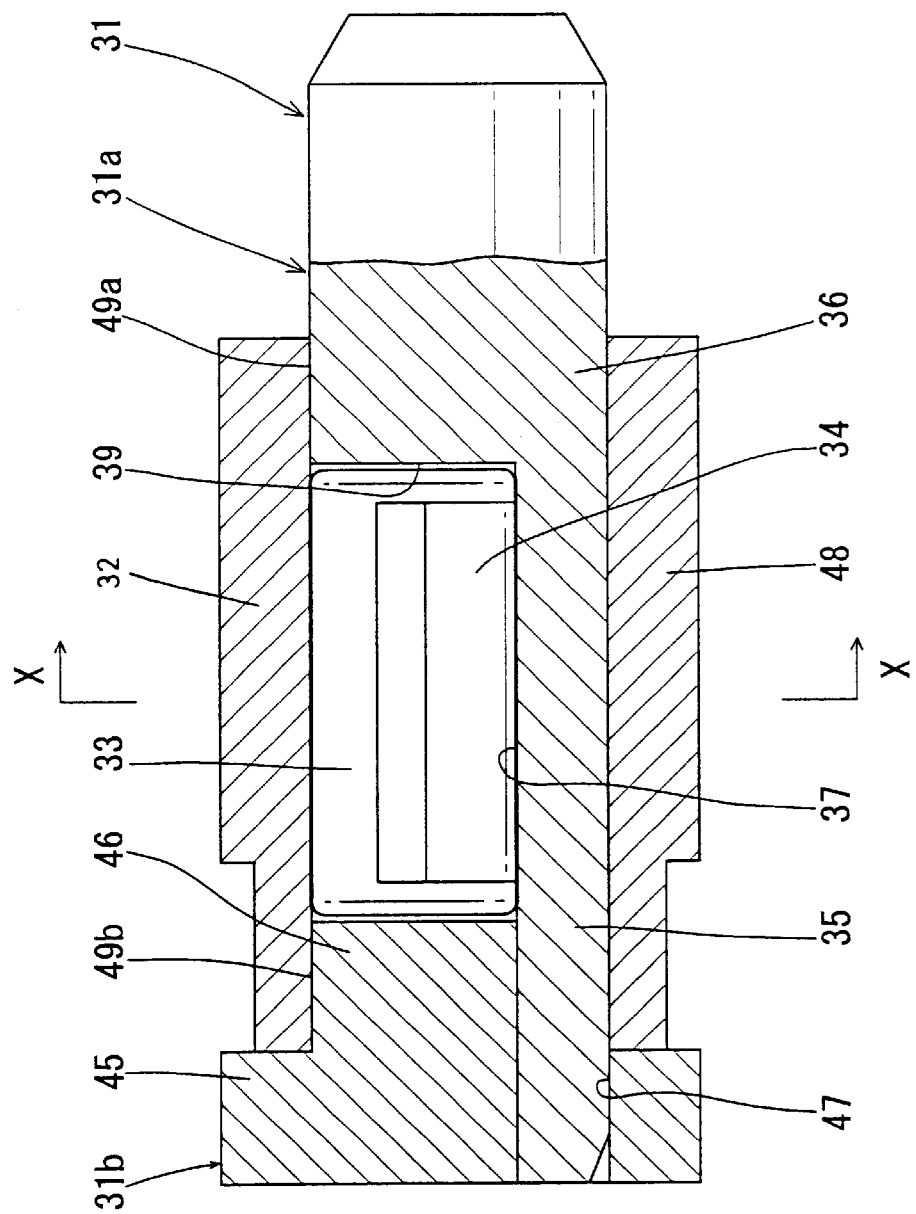
FIG. 5 is a sectional view of a second embodiment.
Figure 6:
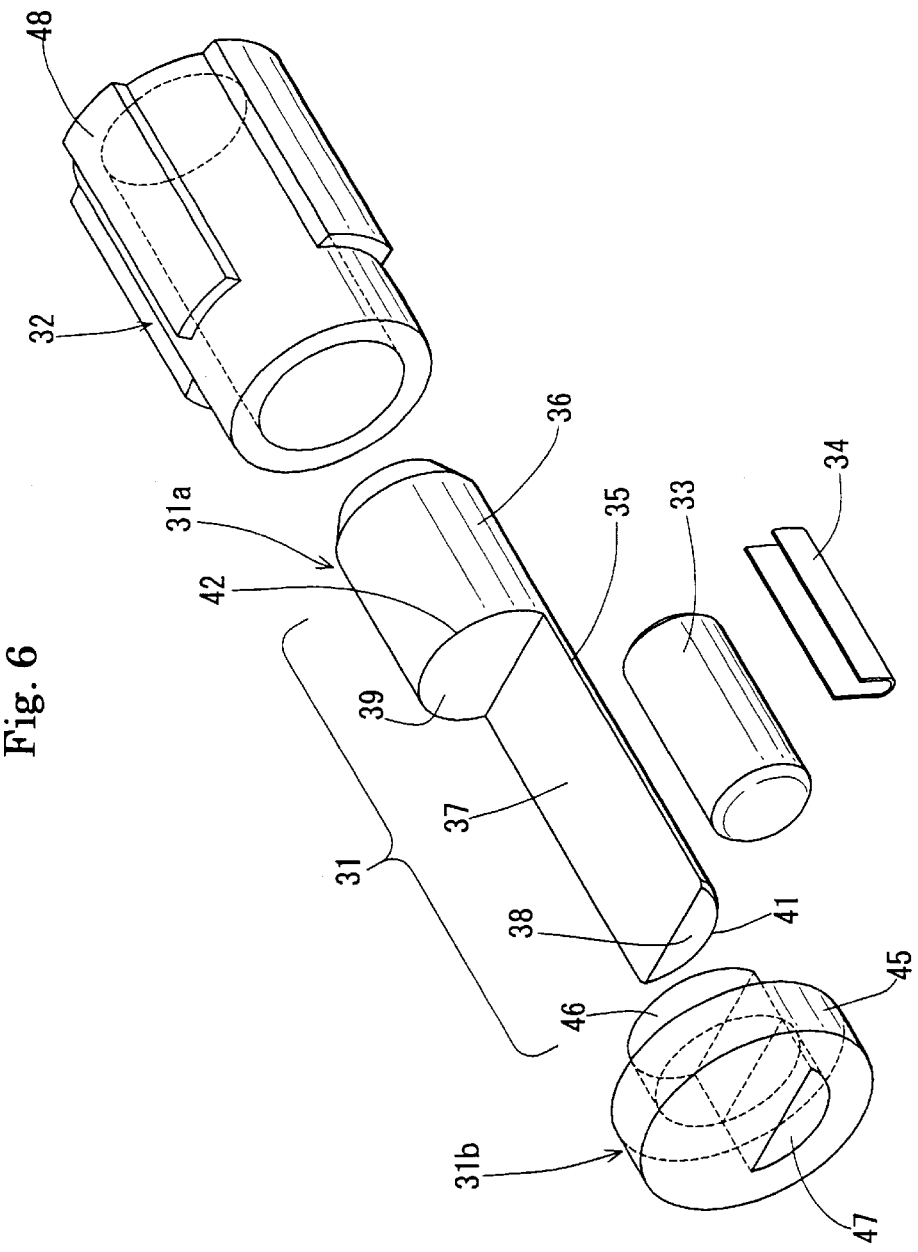
FIG. 6 is an exploded perspective view of the same.

A one-way clutch of a second embodiment shown FIGS. 5 and 6 comprises an inner member 31, an outer ring 32, a roller 33 and a spring member 34.

Figure 8A:
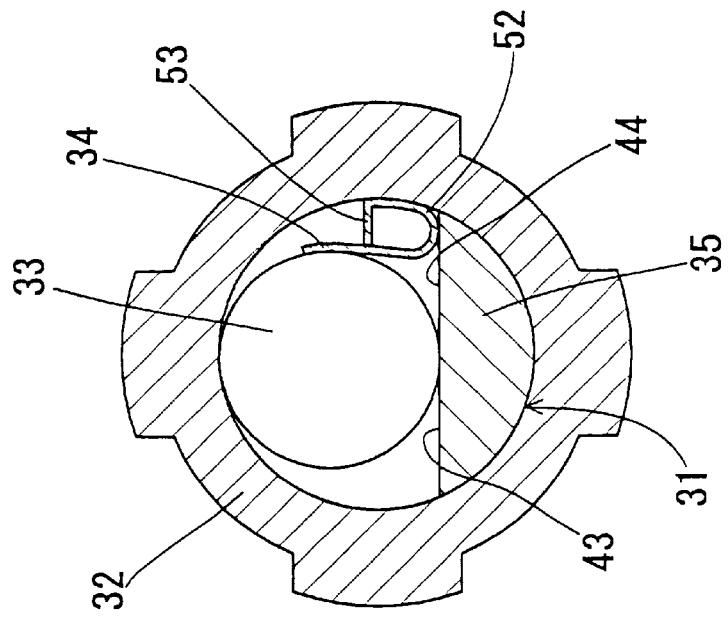
FIG. 8A is a sectional view of the second embodiment including a spring deflection restricting portion.

The inner member 31 comprises an integrated shaft member 31a and a lid member 31b. The integrated shaft member 31a includes a semi-columnar portion 35 and a shank 36. The semi-columnar portion 35 has a flat surface 37 formed by longitudinally cutting the shaft partially from its one end to an intermediate portion, and an end face 38 at one end. An end face 39 is formed on one side of the shank 36. The end face 38 and the end face 39 are in such a relation that the former has a minor arc 41 and the latter has a major arc 42. As will be described later, the flat surface 37 forms a cam surface 43 and a spring seat 44 (FIG. 8A).

The lid member 31b is provided with a flange portion 45 having a larger diameter than the shank 36 and a cut-out protrusion 46 coincident with the shape of the end face 39. Also, the lid member 31b is formed with a semi-circular hole 47 coincident with the end face 38.

The outer ring 32 is rotatably fitted on the inner member 31 and is provided with a plurality of longitudinal ribs 48 on its outer-diameter surface to prevent relative rotation.

When the integrated shaft member 31a of the inner member 31 is fitted in the outer ring 32, a radial bearing 49a for supporting one end of the outer ring 32 is formed by the outer-diameter surface of the shank 36 (FIG. 5). In a space surrounded by the inner-diameter surface of the outer ring 32 and the flat surface 37 of the integrated shaft member 31a, the roller 33 and the spring member 34 are housed. Further, in order to prevent them from coming out, the semi-columnar protrusion 46 of the lid member 31b is fitted into the outer ring 32. By outer-diameter surfaces of the thus fitted semi-columnar protrusion 46 and the semi-columnar portion 35, a radial bearing 49b for supporting the other end of the outer ring 32 is formed.

As described above, the integrated shaft member 31a is mounted in the outer ring 32, and the roller 33 and the spring member 34 are mounted in the space between the flat surface 37 and the inner-diameter surface of the outer ring 32, and the lid member 31b is fitted. Thus the integrated shaft member 31a and the lid member 31b are formed of separate members.

But another assembling method may be employed in which after the members 31a and 31b are assembled beforehand, and the roller 33 and the spring member 34 are mounted, the assembly is fitted in the outer ring 32 while taking care so that the spring member 34 will not come out. If this method is employed, it is possible to form the members 31a and 31b from a single member.

In FIG. 5, the portion of the shank 36 protruding outwardly from the outer ring 32 is a portion which functions as a shaft. Its length is determined according to the function. Since the portion having the function as a shaft is integrated, it is called the integrated shaft member 31a". But the portion having the function as a shaft may be formed as a separate member, a member comprising the radial bearing 49a and the semi-columnar portion 35 may be provided, and it may be coupled to the shaft by a suitable means.

Figure 7:
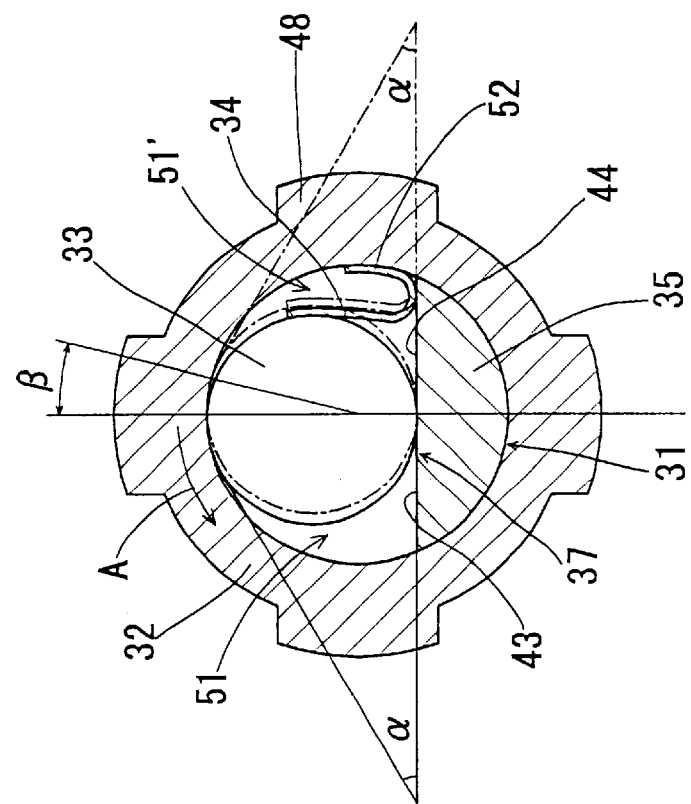
FIG. 7 is a sectional view along line X—X of FIG. 5.

The roller 33 is formed so as to have a diameter slightly smaller than the maximum length of the space formed by the inner-diameter surface of the outer ring 32 and the flat surface 37 on the semi-columnar portion 35. When the roller 33 is housed in the space, irregularly shaped spaces are formed on both sides of the roller 33 (FIG. 7). One of the spaces and the portion occupied by the roller 33 form a roller receiving portion 51, and the remaining space forms a spring receiving portion 51'. The portion of the flat surface 37 forming the roller receiving portion 51 functions as the cam surface 43. A predetermined wedge angle a is formed by the cam surface 43 and the inner-diameter surface of the outer ring 32.

The spring member 34 is formed by bending a rectangular elastic metallic plate in the shape of letter U to form a fixed portion 52, retaining this portion between the spring seat 44 and the inner-diameter surface of the outer ring 32 and pressing one of the free ends against the roller 33 to bias the roller toward the narrow side of the roller receiving portion 51.

The one-way clutch of the second embodiment is as described above. When the outer ring 32 turns in the direction of the arrow A (FIG. 7) relative to the inner member 31, the roller 33 will move to the narrow side of the roller receiving portion 51 (moves from the position of one-dot chain line in FIG. 7 to the position of solid line). As a result, the biting develops, so that the roller locks. Torque is thus transmitted. If the turning direction is opposite to the above, the roller 33 will move to the wide side and locking will be released, so that the roller 33 idles and the torque transmission is shut off.

When the roller 33 moves to the wide side, the roller compresses the spring member 34 while retracting to a range shown by the angle β, exceeding the widest portion. When the amount of retraction grows over a predetermined value, a wedge angle a in the reverse direction develops on the side of the spring receiving portion 51', so that the roller 33 may lock during idling.

If the spring force of the spring member is set large to prevent locking during idling of the roller 33, the spring member will not reveal its inherent function of imparting a suitable biasing force to achieve stability of operation of the roller 33. Also, it is conceivable to provide a rib for restricting retraction of the roller 33 between the cam surface 43 and the spring seat 44. But since flatness of the flat surface 37 is impaired, ease of manufacture will decrease.

Thus, according to this invention, to prevent locking during idling of the roller 33 without influencing the biasing force against the roller, a restricting portion 53 for preventing rearward retraction of the roller 33 beyond a predetermined amount is provided on the spring member 34 (as shown in FIG. 8A to FIG. 9B).

Figure 8B:
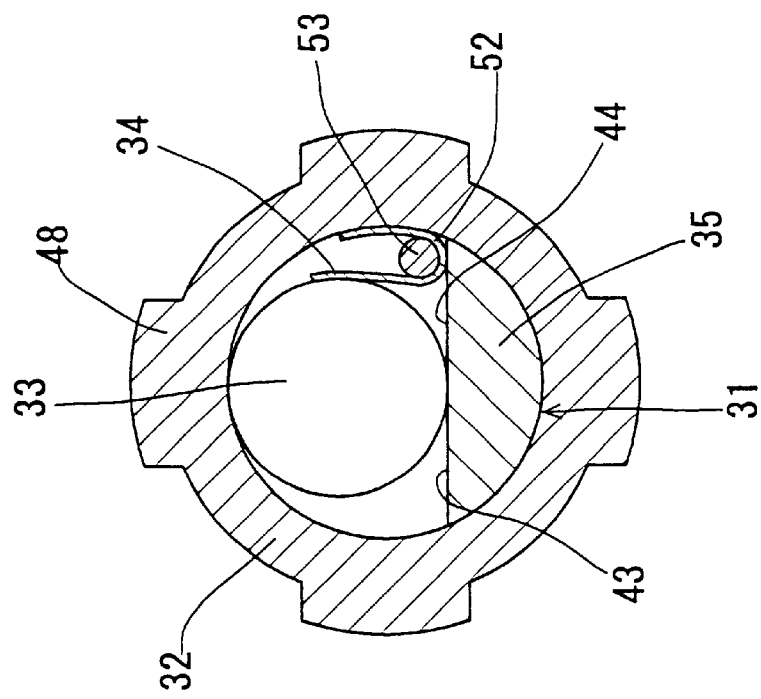
FIG. 8B is a sectional view of the second embodiment including a modified spring deflection restricting portion.

FIG. 8A shows an arrangement in which the free end of the fixed portion 52 of the spring member 34, which is bent in the shape of the letter U, is bent inwardly to abut the other side to form the restricting portion 53, thereby restricting rearward flexibility of the spring member 34. FIG. 8B shows an arrangement in which a shaft is fitted in the U-shaped bent portion of the spring member 34 to form the restricting portion 53, thereby restricting rearward flexibility of the spring member 34.

Figure 9A:
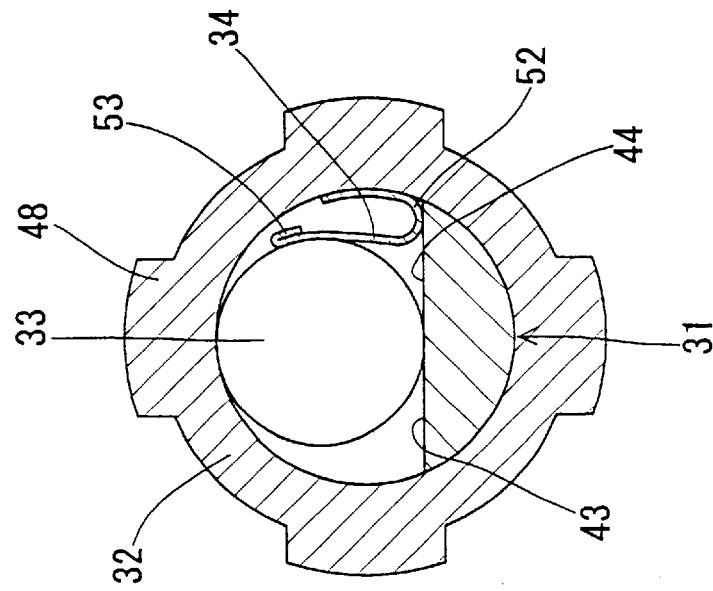
FIG. 9A is a sectional view of the second embodiment including another modified spring deflection restricting portion.
Figure 9B:
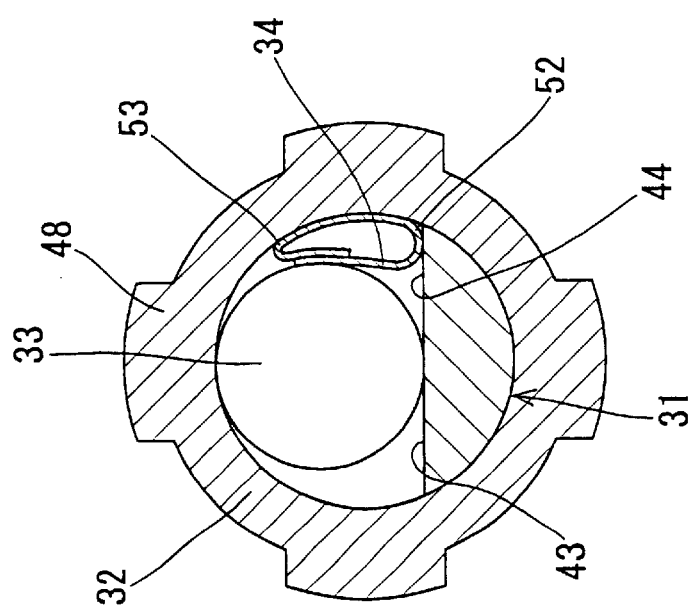
FIG. 9B is a sectional view of the second embodiment including another modified spring deflection restricting portion.

FIG. 9A shows an arrangement in which retraction of the roller 33 is restricted by providing a restricting portion 53 by bending over the free end of the spring member 34, thereby narrowing the distance between the roller 33 and the inner-diameter surface of the outer ring 32. FIG. 9B shows an arrangement in which the spring member 34 is bent in the shape of a ring to form the restricting portion 53 and it is disposed between the roller 33 and the inner-diameter surface of the outer ring 32.

By providing the restricting portion 53, it is possible to make a common surface forming the cam surface 43 and the spring seat 44 into a flat surface 37 and prevent retraction of the roller 33 during idling beyond a limit, thus preventing locking.

Third Embodiment

Figure 10:
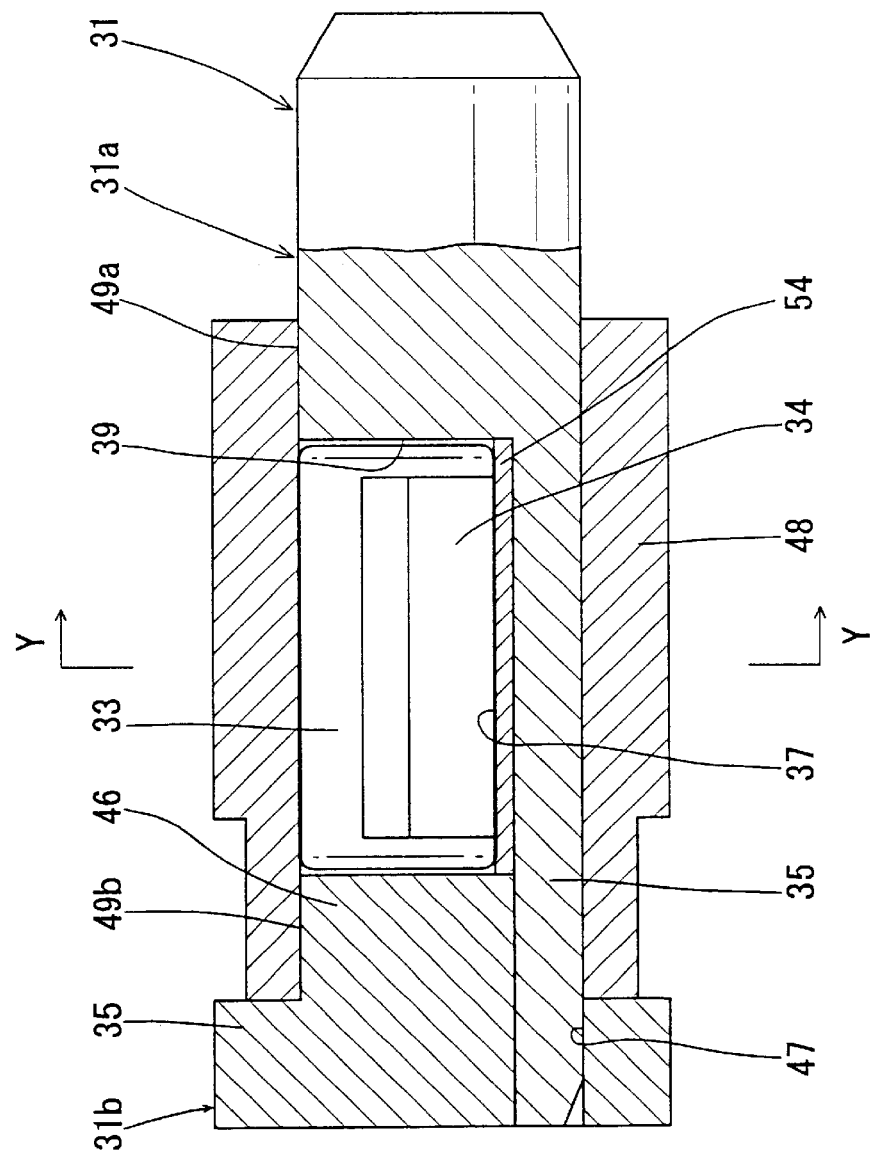
FIG. 10 is a sectional view of a third embodiment.
Figure 11:
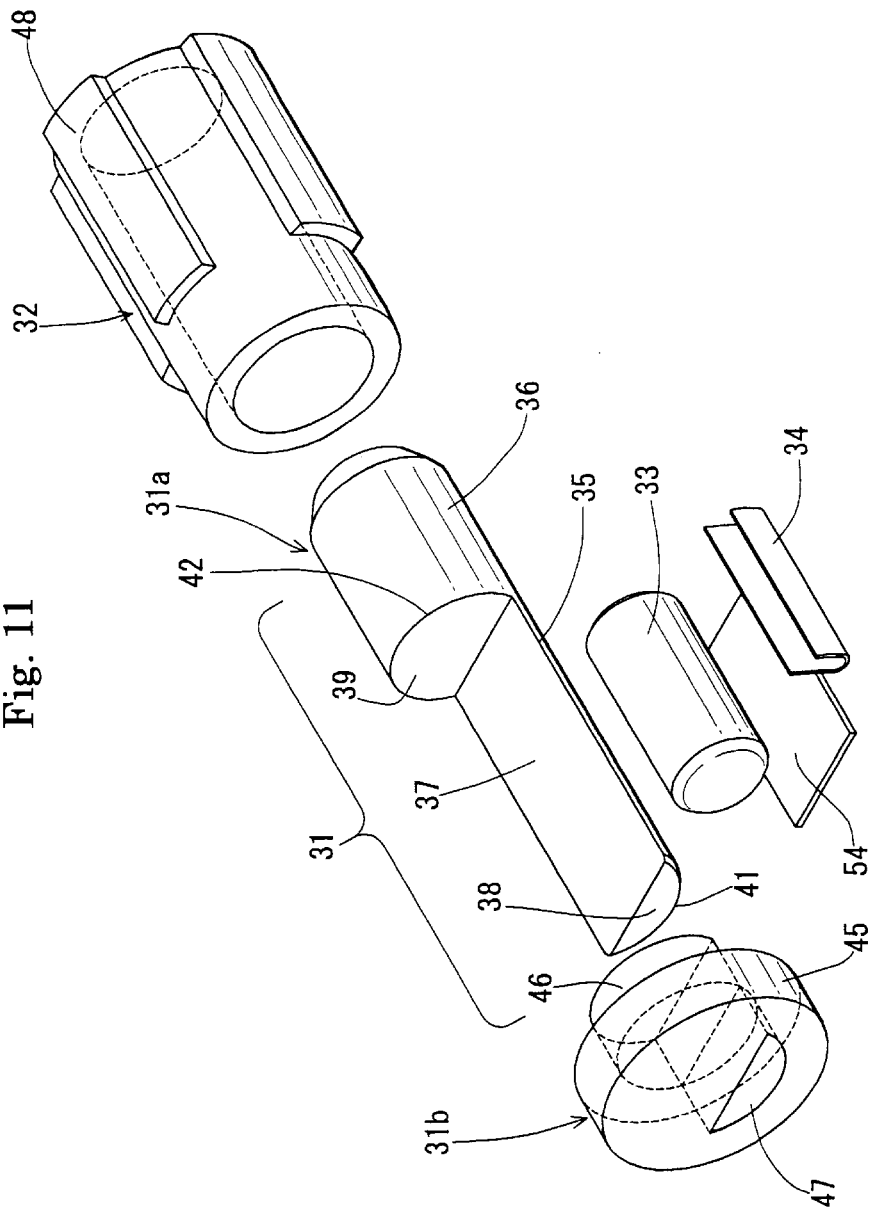
FIG. 11 is an exploded perspective view of the same.
Figure 12:
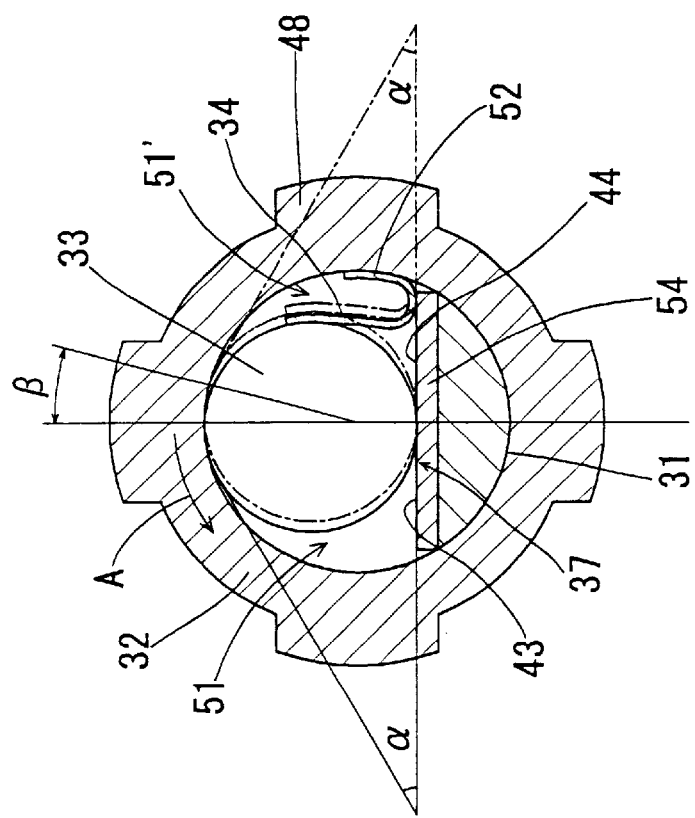
FIG. 12 is a sectional view along line Y—Y of FIG. 10.
Figure 13A:
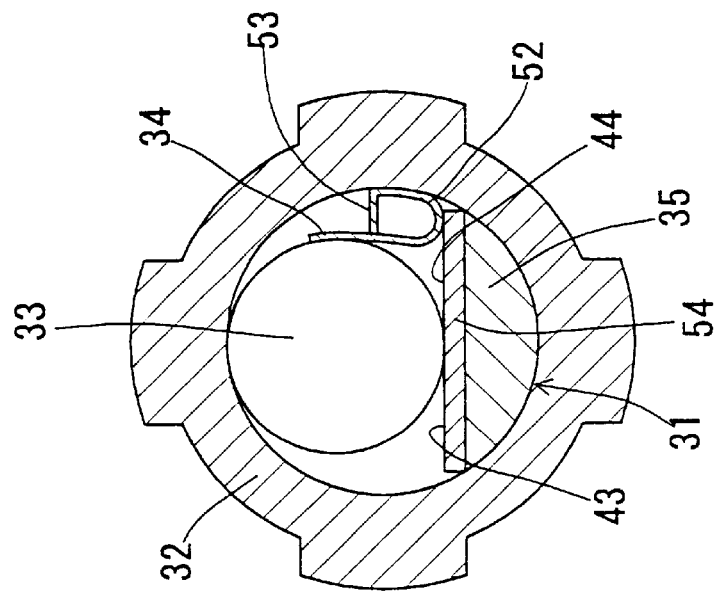
FIG. 13A is a sectional view of a modification of the third embodiment.
Figure 13B:
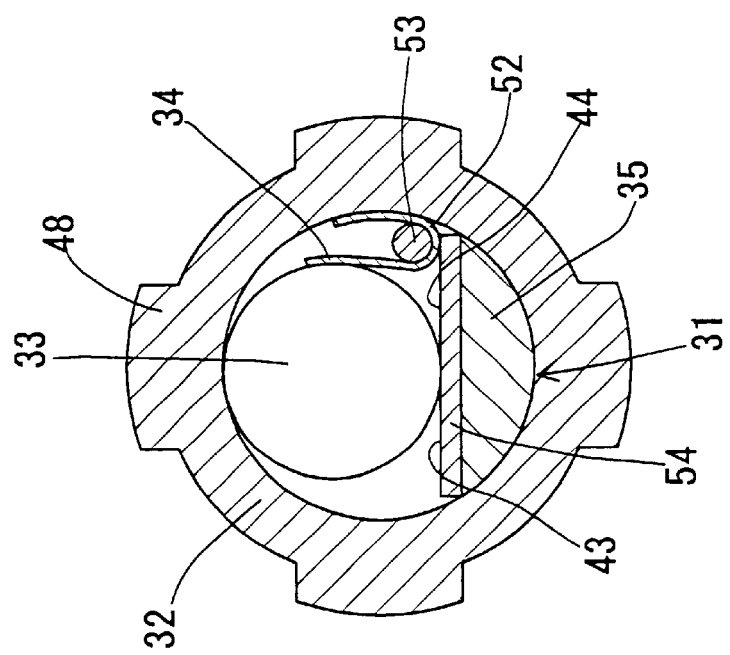
FIG. 13B is a sectional view of another modification of the third embodiment.
Figure 15:
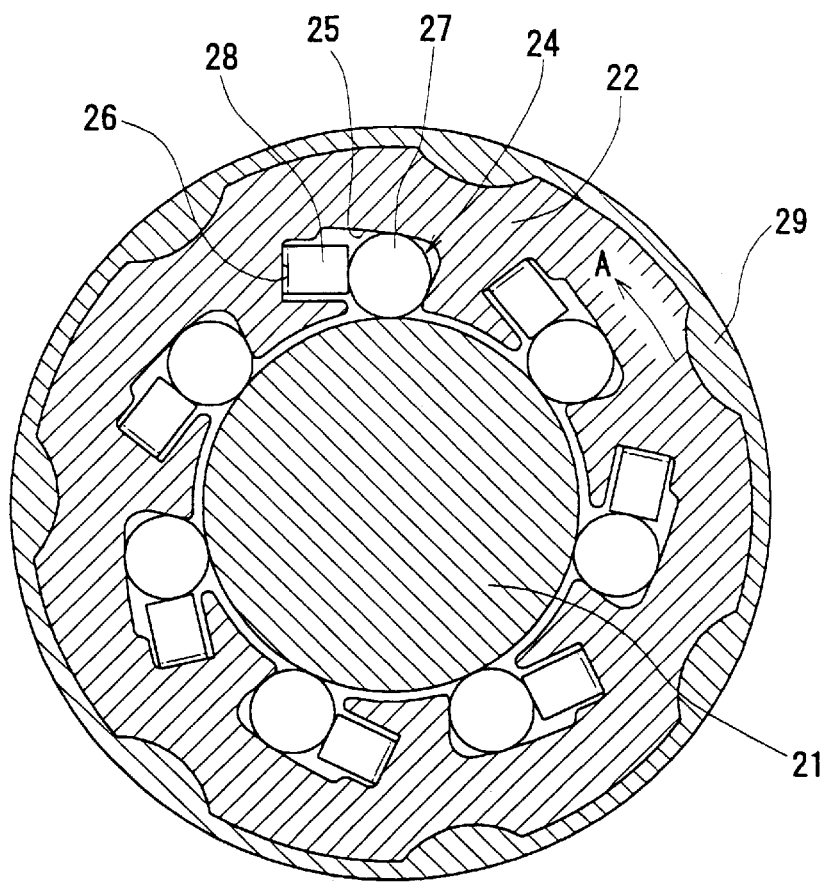
FIG. 15 is a sectional view showing a conventional one-way clutch.

Next, a one-way clutch of the third embodiment is shown in FIGS. 10–12. A metallic reinforcing plate 54 having a predetermined hardness is placed on the flat surface 37 in the one-way clutch of the second embodiment, and the cam surface 43 and the spring seat 44 are formed on the surface of the plate 54. The plate 54 is formed of a metallic plate such as an iron plate and bonded to the flat surface 37.

By providing the reinforcing plate 54, even if the integrated shaft member 31a of the inner member 31 is made of a material that is easy to mold but low in hardness, such as a resin or a sintered alloy, it can withstand high surface pressure applied from the roller 33. Since other structures and operations are the same as in the second embodiment, the same reference numbers are attached to the same parts and their description is omitted.

The one-way clutch and the one-way clutch assembly according to the first embodiment have the following advantages:

(1) Since it comprises the inner member, the outer ring, at least one rolling element and spring member, the number of parts is fewer, the cost is low and assembling is easy.

(2) Since the shaft 5 is not passed through the one-way clutch and the roller receiving portion and the spring receiving portion are provided in the cut-out portion of the inner member, which is coupled to one end of the shaft 5, it is possible to make the one-way clutch assembly compact.

(3) If the outer diameter of the outer ring is the same as that of the shaft, a one-way clutch assembly is provided in which a one-way clutch is integral with the shaft.

Also, the one-way clutch of the second embodiment has the following advantages:

(1) Because the cam surface for bearing the rolling element and the bearing seat for receiving the bearing member are formed on a common flat surface, the inner member is easy to manufacture. Also, because the flat surface has no directional limitation, the inner member can be used for one-way clutches having different locking directions in common.

(2) By providing a reinforcing plate on the flat surface, higher torque can be transmitted, and the inner member can be made of a resin by molding or of sintered alloy.

(3) By providing a restricting portion on the spring member, locking during idling can be prevented without affecting the biassing function against the rolling element.

What is claimed is:

1. A one-way clutch comprising an inner member, an outer ring relatively rotatably mounted on said inner member, a rolling element mounted between said inner member and said outer ring, and a spring member for biasing said rolling element in one direction, a rolling element receiving portion having a predetermined wedge angle and a spring receiving portion communicating with said rolling element receiving portion being provided between said inner member and said outer ring, said spring member being received in said spring receiving portion, said rolling element being received in said rolling element receiving portion and biased by said spring member toward the narrow side of said rolling element receiving portion, wherein said inner member comprises a semi-columnar portion, and said rolling element receiving portion and said spring receiving portion are formed by said semi-columnar portion, wherein said semi-columnar portion is formed with a flat surface, a reinforcing plate is mounted on said flat surface, and a cam surface for forming a wedge angle for said rolling element receiving portion and a spring seat for said spring receiving portion are formed on said reinforcing plate.

2. A one-way clutch as claimed in claim 1 wherein said spring member is provided with a restricting portion for restricting the retraction of said rolling element during idling.

3. A one-way clutch as claimed in claim 1 wherein said inner member comprises an integrated shaft member and a lid member, and radial bearings are formed on said integrated shaft member and said lid member to support both ends of said outer ring.

4. A one-way clutch comprising an inner member, an outer ring relatively rotatably mounted on said inner member, a rolling element mounted between said inner member and said outer ring, and a spring member for biasing said rolling element in one direction, a rolling element receiving portion having a predetermined wedge angle and a spring receiving portion communicating with said rolling element receiving portion being provided between said inner member and said outer ring, said spring member being received in said spring receiving portion, said rolling element being received in said rolling element receiving portion and biased by said spring member toward the narrow side of said rolling element receiving portion, wherein said inner member comprises a semi-columnar portion, and said rolling element receiving portion and said spring receiving portion are formed by said semi-columnar portion, wherein said semi-columnar portion is formed with a flat surface, and a cam surface for forming a wedge angle for said rolling element receiving portion and a spring seat for said spring receiving provide are provided on said flat surface, and wherein said spring member is provided with a restricting portion for restricting the retraction of said rolling element during idling.

5. A one-way clutch as claimed in claim 4 wherein said inner member comprises an integrated shaft member and a lid member, and radial bearings are formed on said integrated shaft member and said lid member to support both ends of said outer ring.

6. A one-way clutch as claimed in claim 4 wherein said inner member is provided with a coupling portion with a shaft, a radial bearing portion for said outer ring, and a flange having a larger diameter than said radial bearing portion and abutting one end face of said outer ring.

7. A one-way clutch assembly wherein an outer annulus is provided on said outer ring of the one-way clutch claimed in claim 6 fitting or integral forming.

8. A one-way clutch assembly as claimed in claim 7 wherein a shaft is coupled to said coupling portion of said inner member of the one-way clutch.

9. A one-way clutch comprising an inner member, an outer ring relatively rotatably mounted on said inner member, a rolling element mounted between said inner member and said outer ring, and a spring member for biasing said rolling element in one direction, a rolling element receiving portion having a predetermined wedge angle and a spring receiving portion communicating with said rolling element receiving portion being provided between said inner member and said outer ring, said spring member being received in said spring receiving portion, said rolling element being received in said rolling element receiving portion and biased by said spring member toward the narrow side of said rolling element receiving portion, wherein said inner member comprises a semi-columnar portion, and said rolling element receiving portion and said spring receiving portion are formed by said semi-columnar portion, wherein said semi-columnar portion is formed with a flat surface, and a cam surface for forming a wedge angle for said rolling element receiving portion and a spring seat for said spring receiving provide are provided on said flat surface, and wherein said inner member comprises an integrated shaft member and a lid member, and radial bearings are formed on said integrated shaft member and said lid member to support both ends of said outer ring.

10. A one-way clutch comprising an inner member, an outer ring relatively rotatably mounted on said inner member, a rolling element mounted between said inner member and said outer ring, and a spring member for biasing said rolling element in one direction, a rolling element receiving portion having a predetermined wedge angle and a spring receiving portion communicating with said rolling element receiving portion being provided between said inner member and said outer ring, said spring member being received in said spring receiving portion, said rolling element being received in said rolling element receiving portion and biased by said spring member toward the narrow side of said rolling element receiving portion, wherein said inner member comprises a semi-columnar portion, and said rolling element receiving portion and said spring receiving portion are formed by said semi-columnar portion, wherein said semi-columnar portion is formed with a cam surface for forming a wedge angle for said rolling element receiving portion, a roller stopper rib, and a spring seat for said spring member, said cam surface being formed by a cut-out surface parallel to a diametrical line of said inner member, said spring seat being disposed opposite to said cam surface relative to said roller stopper rib.

11. A one-way clutch as claimed in claim 10 wherein said inner member is provided with a coupling portion with a shaft, a radial bearing portion for said outer ring, and a flange having a larger diameter than said radial bearing portion and abutting one end face of said outer ring.

12. A one-way clutch assembly wherein an outer annulus is provided on said outer ring of the one-way clutch claimed in claim 11 by fitting or integral forming.

13. A one-way clutch assembly wherein an outer annulus is provided on said outer ring of the one-way clutch claimed in claim 10 by fitting or integral forming.

\* \* \* \* \*